United States Patent
Dang et al.

(10) Patent No.: US 7,991,584 B2
(45) Date of Patent: Aug. 2, 2011

(54) SYSTEM AND METHOD FOR TESTING A FAN INTERFACE OF A MOTHERBOARD

(75) Inventors: De-Hua Dang, Shenzhen (CN); Po-Chang Wang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 366 days.

(21) Appl. No.: 12/195,421

(22) Filed: Aug. 21, 2008

(65) Prior Publication Data

US 2009/0150122 A1  Jun. 11, 2009

(30) Foreign Application Priority Data

Dec. 6, 2007  (CN) .......................... 2007 1 0202905

(51) Int. Cl.
*G06F 11/26* (2006.01)
*G06F 17/00* (2006.01)

(52) U.S. Cl. ............ 702/183; 702/79; 702/78; 702/117; 714/742

(58) Field of Classification Search .................. 702/183, 702/79, 78, 117, 145
See application file for complete search history.

(56) References Cited

U.S. PATENT DOCUMENTS

| 5,930,112 A * | 7/1999 | Babinski et al. | 361/695 |
| 7,586,287 B2 * | 9/2009 | Chen et al. | 318/811 |
| 2005/0174737 A1 * | 8/2005 | Meir | 361/697 |
| 2009/0003806 A1 * | 1/2009 | Zou et al. | 388/811 |

FOREIGN PATENT DOCUMENTS

| CN | 1258818 A | 7/2000 |
| CN | 2615736 Y | 5/2004 |
| CN | 1523471 A | 8/2004 |
| TW | 200400695 A | 1/2004 |
| TW | I285740 B | 8/2007 |

* cited by examiner

*Primary Examiner* — Hal D Wachsman
(74) *Attorney, Agent, or Firm* — Frank R. Niranjan

(57) ABSTRACT

A system for testing a fan interface on a motherboard is provided. A fan simulator receives a PWM signal from a fan interface of the motherboard, converts the PWM signal to a TACH signal and outputs the TACH signal to a computer via a fan connector. A difference between the actual rotation speed from the TACH signal and a preset desired rotation speed of the fan simulator is determined and analyzed by comparing the difference with a preset allowable error margin.

10 Claims, 3 Drawing Sheets

SYSTEM AND METHOD FOR TESTING A FAN INTERFACE OF A MOTHERBOARD

BACKGROUND

1. Field of the Invention

Embodiments of the present disclosure relate to computer testing systems and methods, and particularly to a system and method for testing a fan interface of a motherboard.

2. Description of Related Art

A motherboard typically has a series of device interfaces, such as slots, sockets, and connectors, which may couple many devices. For example, one or more fans may be coupled with one or more fan interfaces on the motherboard. Before shipment, these fan interfaces on the motherboard have to undergo a series of procedural tests to check their operability. However, testing the fan interfaces comprises considering many factors of the fan interface, such as diameters of leaves, attributes of material, electrical and mechanical properties of the fan. These factors may influence rotation speeds of the fan, and thus, have influence on the test result.

What is needed, therefore, is a system and method for testing a fan interface of a motherboard, to reduce test cost and improve test efficiency.

SUMMARY

A system for testing a fan interface of a motherboard is provided. The system comprises a parameter setting module, a diagnosis module and at least one processor executing the parameter setting module and the diagnosis module. The parameter setting module is configured for setting a duty cycle of a pulse width modulation (PWM) signal generated by a monitor chip on the motherboard, setting a desired rotation speed of the fan simulator, and an allowable error of the desired rotation speed and an actual speed of the fan simulator. The diagnosis module is configured for computing a difference of the actual rotation speed and the desired rotation speed, and determining a test result by comparing the difference with the allowable error.

Other objects, advantages and novel features will become more apparent from the following detailed description of certain embodiments of the present disclosure when taken in conjunction with the accompanying drawings, in which:

DETAILED DESCRIPTION OF CERTAIN INVENTIVE EMBODIMENTS

Figure 1:
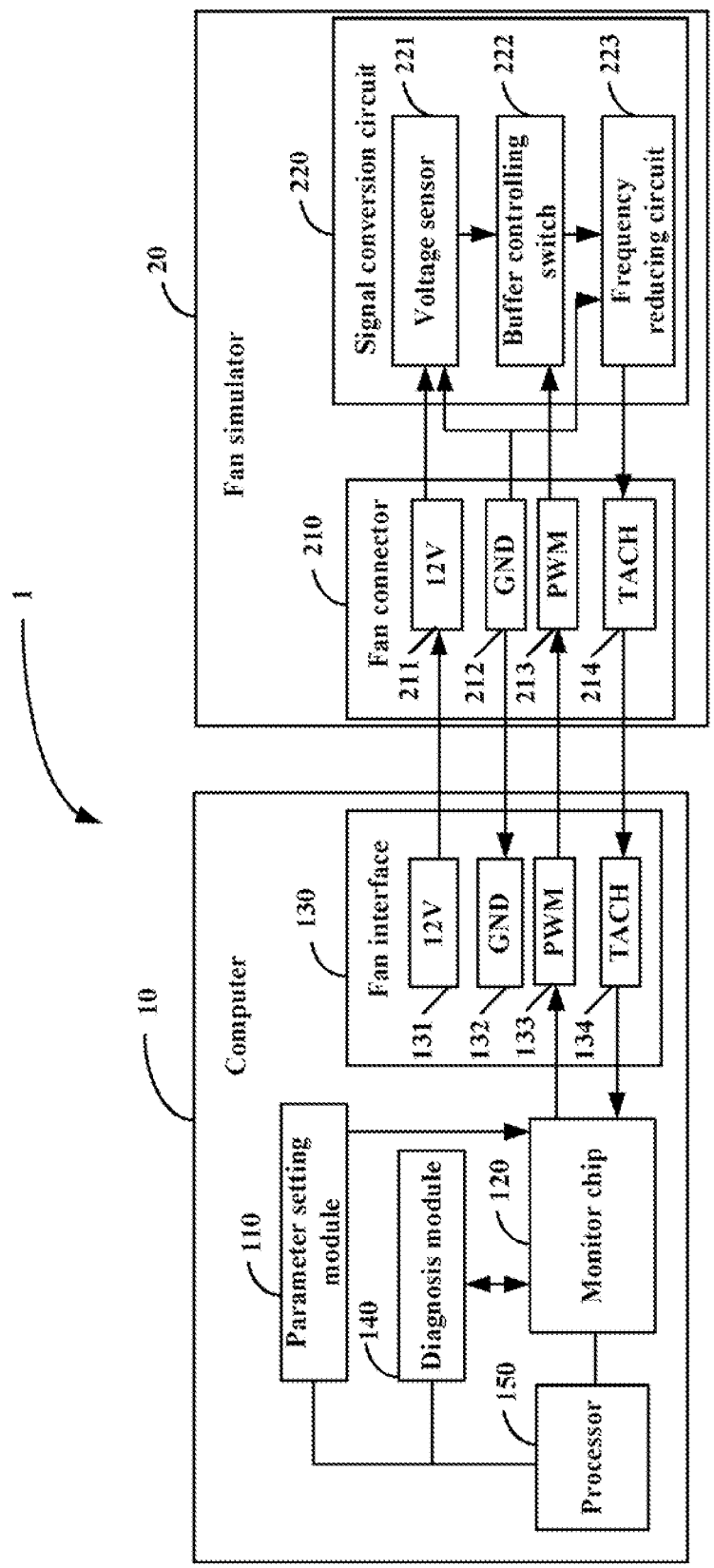
FIG. 1 is a block diagram of one embodiment of a system for testing a fan interface of a motherboard.

FIG. 1 is a block diagram of one embodiment of a system 1 for testing a fan interface 130 of a motherboard of a computer 10. A fan simulator 20 is electronically coupled to the fan interface 130 of the computer 10. In one embodiment, the computer 10 may comprise a parameter setting module 110, a monitor chip 120, the fan interface 130, and a diagnosis module 140. One or more specialized or general purpose processors, such as a processor 150 executes the parameter setting module 110 and the diagnosis module 140. The fan simulator 20 may comprise a fan connector 210 and a signal conversion circuit 220.

In one embodiment, the fan interface 130 is a four-wire interface that comprises a voltage (12V) signal output 131, a grounding wire 132, a pulse width modulation (PWM) signal output 133 and a tachometer (TACH) signal input 134. The fan connector 210 is a four-wire connector that comprises a voltage (12V) signal input 211, a grounding wire 212, a PWM signal input 213 and a TACH signal output 214, which respectively correspond to the four wires of the fan interface 130.

The parameter setting module 110 is configured for setting a plurality of parameters for testing the fan interface 140. The parameters, in one embodiment, comprise a duty cycle of PWM signals generated by the monitor chip 130, a desired rotation speed of the fan simulator 20, and an allowable error margin of the desired rotation speed and an actual rotation speed of the fan simulator 20. The duty cycle may be any value from 0% to 100% depending on the embodiment.

The monitor chip 120 generates a PWM signal according to the duty cycle, and outputs the PWM signal to the fan interface 130.

The fan interface 130 receives the PWM signal and transmits the PWM signal to the fan connector 210 via the PWM signal output 133. Furthermore, the fan interface 130 outputs a voltage signal via the voltage signal output 131.

The fan connector 210 receives the PWM signal via the PWM signal input 213, receives the voltage signal via the voltage signal input 211, and transmits the PWM signal and the voltage signal to the signal conversion circuit 220 via the PWM signal input 213 and the voltage signal input 211 respectively.

In one embodiment, the signal conversion circuit 220 comprises a voltage sensor 221, a buffer controlling switch 222, and a frequency reducing circuit 223. The voltage sensor 221 detects the voltage signal from the voltage signal input 211 of the fan connector 210, and transmits the voltage signal to the buffer controlling switch 222. The buffer controlling switch 222 receives the PWM signal from the PWM signal output 213 of the fan connector 210, and transmits the PWM signal to the frequency reducing circuit 223 when the voltage signal is detected by the voltage sensor 221. The frequency reducing circuit 223 receives the PWM signal from the buffer controlling switch 222, converts the PWM signal having a high frequency to a TACH signal having a low frequency, and outputs the TACH signal to the fan connector 210 via the TACH signal output 214 of the fan connector 210.

The fan connector 210 receives the TACH signal from the frequency reducing circuit 223, and transmits the TACH signal to the fan interface 130 via the TACH signal output 214 of the fan connector 210.

The fan interface 130 receives the TACH signal from the TACH signal output 214 of the fan connector 210.

The monitor chip 120 obtains an actual rotation speed of the fan simulator 20 from the TACH signal.

The diagnosis module 140 computes a difference between the actual rotation speed and the desired rotation speed of the fan simulator 20, and determines if the difference is less than or equal to the allowable error margin. The diagnosis module 140 further determines that the fan simulator 20 passes the test, if the difference is less than or equal to the allowable error margin. That is, the fan interface 130 is working in a good condition. Otherwise, if the difference is more than the allowable error margin, the diagnosis module 140 determines that the fan simulator 20 fails the test. That is, the fan interface 130 is working in an abnormal condition.

Figure 2:
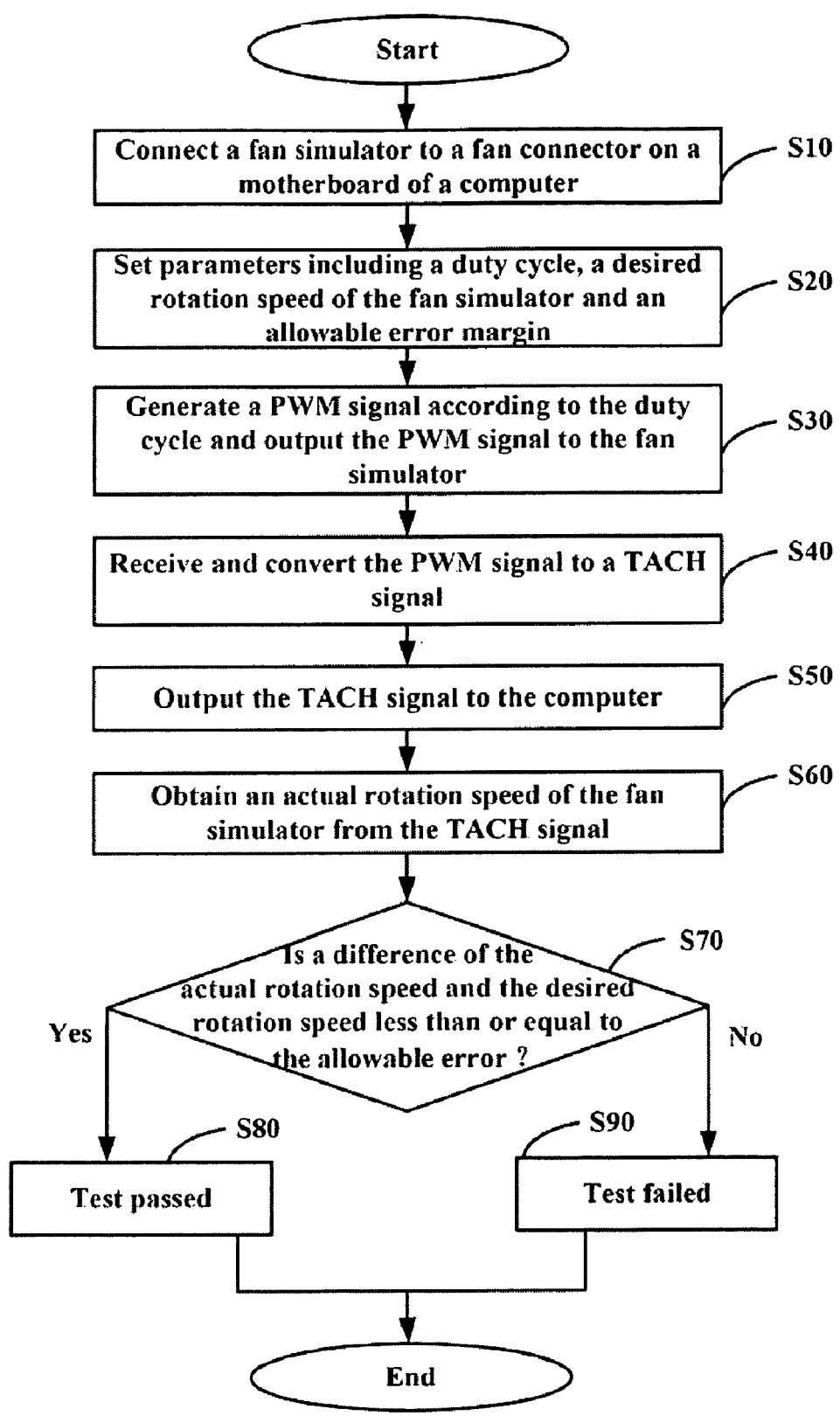
FIG. 2 is a flowchart of one embodiment of a method for testing a fan interface of a motherboard.

FIG. 2 is a flowchart of one embodiment of a method for testing a fan interface of a motherboard. Depending on the embodiment, additional blocks may be added, others removed, and the ordering of the blocks may be changed.

In block S10, the fan simulator 20 is connected to the fan interface 130 on the motherboard of the computer 10. In block S20, the parameter setting module 110 sets parameters for testing the fan interface 140. As mentioned above, the parameters comprise a duty cycle of PWM signals generated by the monitor chip 130, a desired rotation speed of the fan simulator 20, and an allowable error margin of the desired rotation speed and an actual speed of the fan simulator 20. These parameters may be predetermined by a user of the computer 10, in one embodiment.

In block S30, the monitor chip 120 generates a PWM signal according to the duty cycle, and outputs the PWM signal to the fan simulator 20 via the PWM signal output 133 of the fan interface 130. In block S40, the fan simulator 20 receives the PWM signal via the PWM signal input 213, and converts the PWM signal to a TACH signal. A detailed description of block S40 is given in FIG. 3 below.

In block S50, the fan simulator 20 outputs the TACH signal to the computer 10 via the TACH signal output 214 of the fan connector 210. In block S60, the computer 10 receives the TACH signal via the TACH input 134 of the fan interface 130, then the monitor chip 120 of the computer 10 obtains an actual rotation speed of the fan simulator 20 from the TACH signal.

In block S70, the diagnosis module 140 computes a difference between the actual rotation speed and the desired rotation speed of the fan simulator 20, and determines if the difference is less than or equal to the allowable error margin. If the difference is less than or equal to the allowable error margin, in block S80, the diagnosis module 140 determines that the fan interface 130 has passed the test. That is, the fan interface 130 is in a good working condition. Otherwise, if the difference is more than the allowable error margin, the diagnosis module 140 determines that the fan interface 130 fails the test. That is, the fan interface 130 is working in an abnormal condition.

Figure 3:
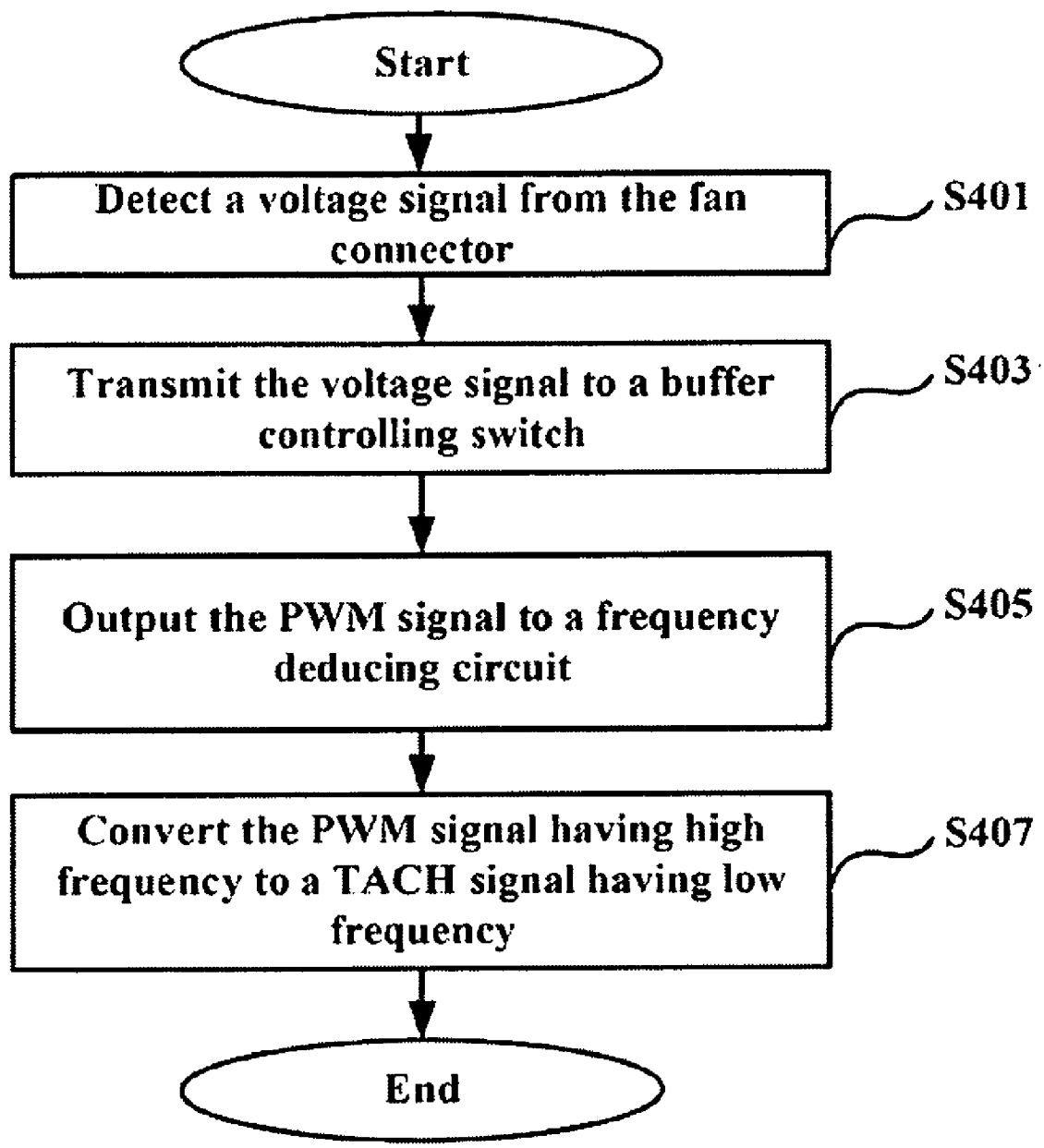
FIG. 3 is detailed description of one embodiment of one block in FIG. 2 for receiving and converting a pulse width modulation (PWM) signal to a tachometer (TACH) signal.

FIG. 3 is a detailed description of one embodiment of block S40 in FIG. 2. In block S401, the voltage sensor 221 detects the voltage signal from the voltage signal input 211 of the fan connector 210. In block S403, the buffer controlling switch 222 receives the PWM signal from the PWM signal output 213 of the fan connector 210, and transmits the PWM signal to the frequency reducing circuit 223 when the voltage signal is detected by the voltage sensor 221. In block S405, the frequency reducing circuit 223 receives the PWM signal from the buffer controlling switch 222, and converts the PWM signal having a high frequency to a TACH signal having a low frequency, then outputs the TACH signal to the fan connector 210.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for testing a fan interface of a motherboard using a fan simulator, the fan simulator comprising a fan connector and a signal conversion circuit, the system comprising:

a parameter setting module configured for setting a duty cycle of a pulse width modulation (PWM) signal having a high frequency to be generated by a monitor chip on the motherboard, setting a desired rotation speed of the fan simulator, and an allowable error margin of the desired rotation speed and an actual rotation speed of the fan simulator, wherein:

the monitor chip generates the PWM signal according to the duty cycle, and outputs the PWM signal to the fan connector via the fan interface;

the fan connector transmits the PWM signal to the signal conversion circuit;

the signal conversion circuit converts the PWM signal to a tachometer (TACH) signal having a low frequency by a frequency reducing circuit, and outputs the TACH signal to the fan interface via the fan connector; and the monitor chip receives the TACH signal from the fan interface and obtains the actual rotation speed of the fan simulator from the TACH signal;

the system further comprising a diagnosis module configured for computing a difference of the actual rotation speed and the desired rotation speed, and determining that the fan interface passes the test if the difference is less than or equal to the allowable error margin, or determining that the fan interface fails the test if the difference is more than the allowable error margin; and at least one processor executing the parameter setting module and the diagnosis module.

2. The system according to claim 1, wherein the fan interface is a four-wire interface that comprises a voltage signal output, a PWM signal output, a TACH signal input and a grounding wire.

3. The system according to claim 2, wherein the fan connector is a four-wire connector that comprises a voltage signal input, a PWM signal input, a TACH signal output and a grounding wire.

4. The system according to claim 1, wherein the signal conversion circuit comprises:

a voltage sensor configured for detecting a voltage signal from the fan connector;

a buffer controlling switch configured for receiving the PWM signal from the fan connector, and transmitting the PWM signal when the voltage signal is detected by the voltage sensor; and the frequency reducing circuit configured for receiving the PWM signal from the buffer controlling switch.

5. A method for testing a fan interface of a motherboard, the method comprising:

providing a fan simulator comprising a fan connector and a signal conversion circuit;

connecting the fan connector with the fan interface;

setting a duty cycle of a pulse width modulation (PWM) signal having a high frequency to be generated, a desired rotation speed of the fan simulator, and an allowable error margin of the desired rotation speed and an actual rotation speed of the fan simulator;

generating the PWM signal according to the duty cycle by a monitor chip of the motherboard, and outputting the PWM signal to the fan simulator via the fan interface;

receiving the PWM signal by the fan connector and converting the PWM signal to a tachometer (TACH) signal having a low frequency by a frequency reducing circuit of the signal conversion circuit;

transmitting the TACH signal to the fan interface via the fan connector;

obtaining the actual rotation speed of the fan simulator from the TACH signal;

computing a difference of the actual rotation speed and the desired rotation speed; and determining that the fan interface passes the test, if the difference is less than or equal to the allowable error margin, or determining that the fan interface fails in the test, if the difference is more than the allowable error margin.

6. The method according to claim 5, wherein before converting the PWM signal to the TACH signal comprises:
   detecting a voltage signal from the fan connector by a voltage sensor of the signal conversion circuit; and
   receiving the PWM signal from the fan connector, and transmitting the PWM signal to the frequency reducing circuit by a buffer controlling switch of the signal conversion circuit when the voltage signal is detected by the voltage sensor.

7. A fan simulator for testing a fan interface of a computer, the fan simulator comprising:
   a fan connector that receives a pulse width modulation (PWM) signal having a high frequency from the fan interface and transmits the PWM signal to a signal conversion circuit of the fan simulator, wherein the PWM signal is generated by a monitor chip of the computer according to a preset duty cycle; and
   the signal conversion circuit converts the PWM signal having the high frequency to a tachometer (TACH) signal having a low frequency by a frequency reducing circuit and transmits the TACH signal to the fan interface via the fan connector, wherein an actual rotation speed of the fan simulator is obtained from the TACH signal by the computer, the computer further computes a difference of the actual rotation speed and a desired rotation speed of the fan simulator, and determines the fan interface passes the test if the difference is less than or equal to a preset allowable error margin of the desired rotation speed and the actual rotation speed, or determines that the fan interface fails the test if the difference is more than the preset allowable error margin.

8. The fan simulator according to claim 7, wherein the fan interface is a four-wire interface that comprises a voltage signal output, a PWM signal output, a TACH signal input, and a grounding wire.

9. The fan simulator according to claim 8, wherein the fan connector is a four-wire connector that comprises a voltage signal input, a PWM signal input, a TACH signal output, and a grounding wire.

10. The fan simulator according to claim 9, wherein the signal conversion circuit further comprises:
    a voltage sensor configured for detecting a voltage signal from the fan connector; and
    a buffer controlling switch configured for receiving the PWM signal from the fan connector, and transmitting the PWM signal to the frequency reducing circuit when the voltage signal is detected by the voltage sensor.

* * * * *